United States Patent
Patrick

[11] 4,027,986
[45] June 7, 1977

[54] HERBICIDE APPLICATOR

[76] Inventor: Stanley R. Patrick, 606 Hickory Circle, Canonsburg, Pa. 15317

[22] Filed: Oct. 23, 1975

[21] Appl. No.: 625,098

[52] U.S. Cl. .................................................. 401/138
[51] Int. Cl.² ............................................ A01C 23/04
[58] Field of Search ... 401/137, 138, 198, 202–205; 47/1.5; 222/187

[56] References Cited
UNITED STATES PATENTS

| 1,054,950 | 3/1913 | Urbanek | 401/205 |
| 2,853,728 | 9/1958 | Nadi | 401/202 |
| 2,896,236 | 7/1959 | Bartkewitz | 401/202 |
| 3,184,888 | 5/1965 | Fruth et al. | 47/1.5 |

*Primary Examiner*—Robert B. Reeves
*Assistant Examiner*—Norman L. Stack, Jr.
*Attorney, Agent, or Firm*—Clarence A. O'Brien; Harvey B. Jacobson

[57] ABSTRACT

A herbicide applicator for applying herbicide by direct contact with unwanted woody-type vegetation. The applicator includes a long hollow tube having a flared bell housing mounted at one end for holding sponge-type material, and an applicator pad covering the end of said housing. Control means for the flow of herbicide are provided by an internal orifice plate on the inner end of the bell housing and in contact with the sponge material, and an adjustable threaded plug at the other end of the tube for controlling air and vacuum within the tube.

9 Claims, 4 Drawing Figures

U.S. Patent  June 7, 1977  4,027,986
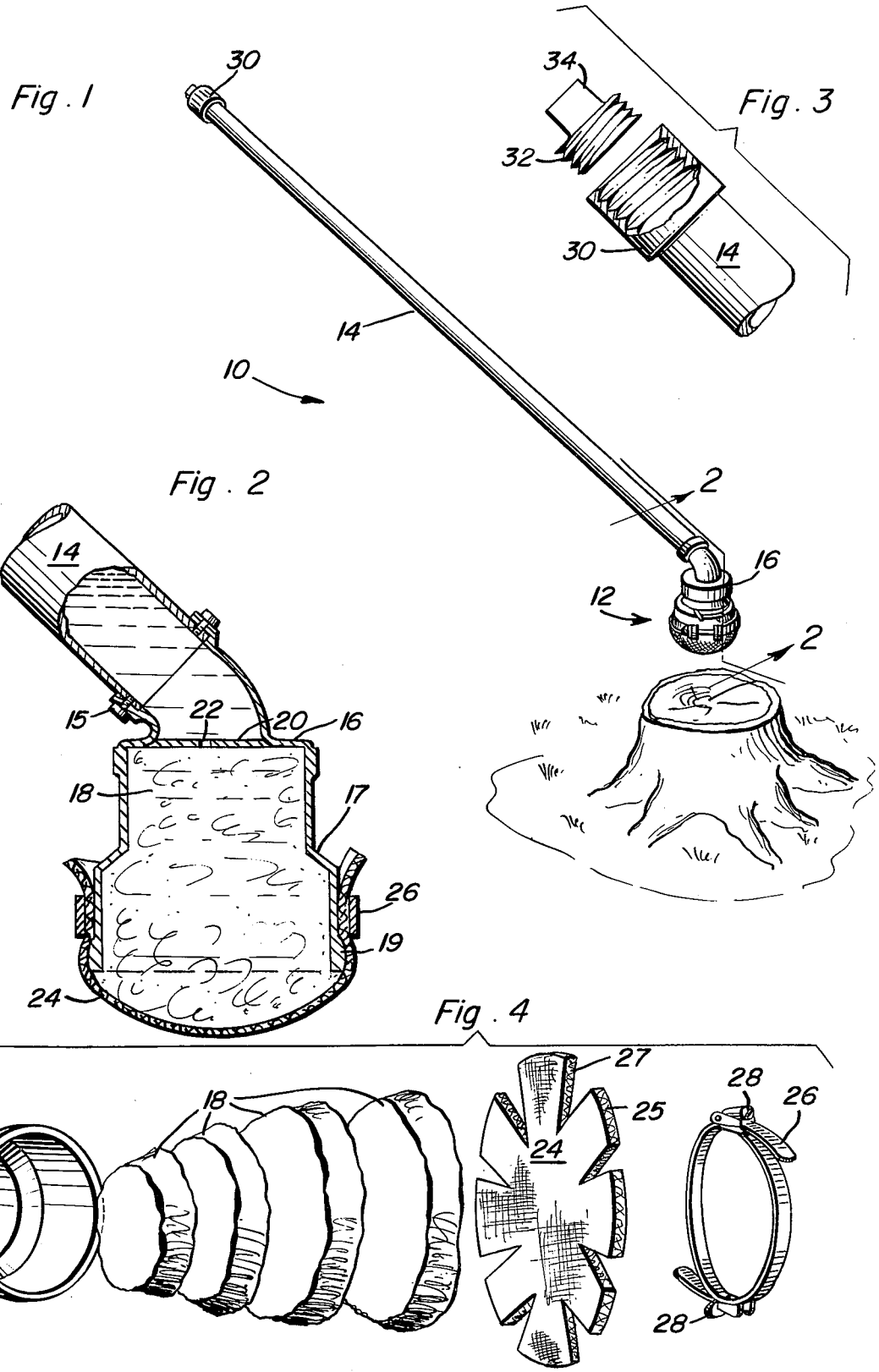

HERBICIDE APPLICATOR

BACKGROUND OF THE INVENTION

1. Field of the Invention

This invention relates to the area of applying herbicides to woody vegetation. The applicator of this invention provides a highly selective control of unwanted woody plants, and is far more reliable in such applications than spray, steady stream or mist-blowing devices. These latter devices are the most common type for application of herbicides.

2. Description of the Prior Art

In the field of application of herbicides to woody vegetation, most of the known prior type devices employ sprays, steady stream, and/or mist-blowing devices. All of these type devices have the great disadvantage of covering a much greater area of vegatation than that which is normally desired.

Also most of the prior art type devices use a great volume of fuel oil which is mixed with the herbicide solutions for the selective treatment. Volumes of mixed herbicide solutions used with spray and steady stream type applicators range between 200 to 600 gallons per five day work week per crew. The applicator of this invention by nature of design reduces this usual 300 to 600 gallon consumption to the range of 5 to 10 gallons for the same area being treated.

One of the greatest defects of other applicators such as spray, steady stream, and mist-blowing devices is the lack of control of same as at all times these devices utilize a release valve or trigger manually operated and the volume being applied becomes a judgment factor by the operator of the device. Multiplying the thousands of individual applications to plant life with a manual control valve as compared to rationed application is much like applying one-half pint of herbicide when only one-half ounce is required. Nothing in the prior art is known which compares with the simple, effective, well-controlled applicator as disclosed by this invention.

SUMMARY OF THE INVENTION

An object of the present invention is to provide a herbicide applicator for applying herbicide by direct contact.

Another object of the present invention is to provide an applicator which will apply rationed amounts of the herbicide mix.

A further object of this invention is to provide an applicator which will provide a more economic, selective and non-contaminating method of right-of-way maintenance for utility companies, forest population control departments, and Department of Transportation road right-of-ways, etc.

The method of application taught herein is to use the applicator of this invention for the purpose of applying controlled amounts of herbicide mix to woody vegetation. The device of this invention has a saturated head portion which will permit an operator to apply a small, yet sufficient amount of herbicide to a tree stump, and/or other type vegetation to be destroyed.

The theory involved in the device and method disclosed herein is that basically "a tree can only be killed once" and with the proper herbicide in ratio of mix, excessive volumes of solution are not required to obtain the desired kill of the unwanted species. The applicator disclosed herein with the proper herbicide and mixed as per labeled instructions controlled by the "Environment Protection Agency", will provide a more economic, selective and non-contaminating method of vegetation control.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view showing the herbicide applicator according to the present invention.

FIG. 2 is a sectional view generally along the line 2—2 of FIG. 1.

FIG. 3 is a view partly in section of the other end of the applicator.

FIG. 4 is an exploded perspective view of the applicator head.

DESCRIPTION OF THE PREFERRED EMBODIMENT

Referring to FIG. 1, numeral 10 refers in general to the entire herbicide applicator being used to apply herbicide to a tree stump. Numeral 12 refers to the specific applicator head. The applicator of this invention comprises a hollow plastic tube or pipe 14 about 1-½ inches inside diameter and about 5' in length. This volume is sufficient to hold approximately one-half gallon of liquid. This body portion is where the herbicide mix is stored when the device is ready for use. At the lower end of the tube 14, as best seen in FIG. 2, is mounted a bell type housing of high impact plastic 16. This end bell is attached by means such as 15 to the lower end of the tube 14. Any known type of attaching means may be used, such as a hose clamp, screws, plastic cement, etc. The end bell 16 has a flared portion 17 expanding into the larger useful opening. Along the outer edge of this opening is a ridge 19 for use in maintaining the outer covering on the housing and to prevent the cover 24 from slipping off the housing. Inside the bell housing are normally layers of sponge material 18 which are frictionally wedged into the housing and covered by a durable porous fabric 24. Ordinary rug material has been found to be satisfactory for member 24. For ease in fitting member 24 to the housing opening and over ridge 19 cutouts 27 may be provided therein leaving projections 25 for engagement by the clamp 26. A clamp means 26 having adjusting screws 28 holds the cover means 24 about the open end of the bell housing as best seen in FIG. 2. Inside the housing and between the innermost layer of sponge material and the lower end of the fluid holding tube 14 is provided a plate 20 having a small orifice hole 22 therein.

The other end of the tube housing 14 has a coupling portion 30 which is threaded internally and a screw plug 32 for closing the end of the housing. This plug and threaded adjustment acts as an air and/or vacuum control means. A square portion 34 is provided on the end of plug 32 for easy turning of the plug by either hand and/or a wrench.

The threads external of screw plug 32 and internal of coupling member 30 are of the well known coarse thread type as used with plumbing pipe and fittings. As is well known with plumbing fittings, the coarse threads at the extreme end of pipes, nipples, etc. are of less diameter than the threads near the unthreaded body portion. This is inherent in the way these coarse threads are cut by the use of conventional pipe threading dies. Such coarse threads will permit leakage therethrough unless pipe joint compound is used, and the joints are securely tightened. This is one reason why coupling members for connections which are to be air and liquid tight, such as automobile carburetor gas lines, etc. use fine threaded connections.

The coupling 30 of this invention, and the threaded plug are provided with such type coarse threads, and since no pipe compound is used when the plug is screwed into the coupling, partial loosening of same will allow air to pass along the threads, and yet prevent loss of the plug out of the end of the coupling. The use of this applicator is quite simple. A proper mix of herbicide and oil to form the usable herbicide solution is poured into the end of tube 14 after the plug 32 has been removed. With some types of herbicides water would be used for the mix solution rather than oil. In the field an easy obtainable one gallon container would be large enough for the mix. The mix solution is then poured into the applicator tube 14. The end cap 32 is then screwed in, making an air-tight seal and trapping the solution in the tube. This cap becomes an adjustable air vlave when loosened slightly and controls the volume of solution flow to the applicator head. The orifice hole 22 in the applicator head permits fluid to saturate the sponge material 18 and also acts as a fluid control valve. An operator can apply the covering 24 against a tree stump, etc. and only controlled amounts of the herbicide mix will be released to treat the stump. If, as the operator works, he finds too much fluid is being released he merely tightens down the screw plug 32 to decrease the rate of flow. Conversely if the head is becoming dry, and not enough herbicide mix is being released to properly cover the vegetation being treated, the operator merely unscrews the plug 32 a portion of a turn, or more, to allow air to enter the upper end of tube 14 and release more herbicide mix to the applicator head. The device of this invention fills a long felt need in the field, is simple, economical, and yet extremely effective.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A herbicide applicator comprising; means for controlling the flow of herbicide fluid so that controlled amounts of fluid may be applied to unwanted vegetation including, a long hollow body portion for holding herbicide fluid having an applicator means at one end thereof, air control means at the other end thereof, the applicator means including a single orifice flow control member, the air control means includes an enlarged coupling portion which is threaded internally and an adjustable coarse threaded screw plug for closing the end with the air control being by the air leaks through the coarse threads when the plug is partially loosened.

2. The device as defined in claim 1 wherein the applicator means also has a housing member with an enlarged opening at one end thereof filled with sponge material and covered with durable porous material mounted on the hollow body portion.

3. In an applicator device for herbicide fluid comprising: means for controlling the flow of herbicide fluid so that controlled amounts of fluid may be applied to unwanted vegetation including; a long hollow tube body with two ends, an enlarged internally threaded coupling at one end of the long tube for receiving the fluid, and adjustable coarse threaded plug for closing the coupling screwed thereinto for controlling the amount of air into the tube body through the screw threads when the plug is slightly loosened, an opening at the other end of the tube body, and applicator means mounted on said other end for applying the fluid in controlled amounts to vegetation to be treated.

4. The device as in claim 3 wherein the applicator means includes an enlarged housing filled with sponge-like material and covered with durable porous material.

5. The device as in claim 4 including clamp means holding the durable porous material to the housing.

6. The device as in claim 5 wherein the housing is bell shaped, with a large opening having an enlarged edge around the opening on the outside thereof for retaining said porous material and said clamp means on the housing.

7. The device as in claim 6 including an orifice member having a small hole in the center thereof mounted in said housing for control of fluid from the body tube to the sponge material.

8. The device as in claim 7 wherein the clamp means for holding porous material to the opening in the bell-shaped housing includes a clamp member having double screws for securing same in clamping engagement with the porous material.

9. The device as in claim 8 wherein the durable porous material on the bell-shaped housing is provided with cutouts around the periphery thereof for ease in proper fit of the material over the enlarged edge around the outside of the opening and for clamping by the said clamp.

* * * * *